United States Patent
Partain, III et al.

(10) Patent No.: US 9,266,969 B2
(45) Date of Patent: Feb. 23, 2016

(54) WELLBORE SERVICING FLUID COMPRISING A CELLULOSE ETHER

(75) Inventors: Emmett M. Partain, III, Bound Brook, NJ (US); Russell L. Kreeger, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 288 days.

(21) Appl. No.: 13/811,575

(22) PCT Filed: Aug. 10, 2011

(86) PCT No.: PCT/US2011/047258
§ 371 (c)(1),
(2), (4) Date: Jan. 22, 2013

(87) PCT Pub. No.: WO2012/021626
PCT Pub. Date: Feb. 16, 2012

(65) Prior Publication Data
US 2013/0130949 A1     May 23, 2013

Related U.S. Application Data

(60) Provisional application No. 61/373,422, filed on Aug. 13, 2010.

(51) Int. Cl.

| | |
|---|---|
| *C08B 11/193* | (2006.01) |
| *C04B 24/38* | (2006.01) |
| *C04B 28/02* | (2006.01) |
| *C04B 35/636* | (2006.01) |
| *C08B 11/08* | (2006.01) |
| *C08B 11/12* | (2006.01) |
| *C08B 11/14* | (2006.01) |
| *C08B 11/145* | (2006.01) |
| *C08B 11/20* | (2006.01) |
| *C08L 1/28* | (2006.01) |
| *C09K 8/035* | (2006.01) |
| *C09K 8/487* | (2006.01) |

(52) U.S. Cl.
CPC ............ *C08B 11/193* (2013.01); *C04B 24/383* (2013.01); *C04B 28/02* (2013.01); *C04B 35/6365* (2013.01); *C08B 11/08* (2013.01); *C08B 11/12* (2013.01); *C08B 11/14* (2013.01); *C08B 11/145* (2013.01); *C08B 11/20* (2013.01); *C08L 1/284* (2013.01); *C08L 1/286* (2013.01); *C08L 1/288* (2013.01); *C09K 8/035* (2013.01); *C09K 8/487* (2013.01); *C09K 2208/00* (2013.01)

(58) Field of Classification Search
None
See application file for complete search history.

(56) References Cited

U.S. PATENT DOCUMENTS

| | | | | |
|---|---|---|---|---|
| 3,804,174 | A | * | 4/1974 | Chatterji et al. ............. 166/293 |
| 3,959,003 | A | * | 5/1976 | Ostroot et al. ................ 106/720 |
| 4,228,277 | A | | 10/1980 | Landoll |
| 4,529,523 | A | | 7/1985 | Landoll |
| 4,579,942 | A | * | 4/1986 | Brode et al. .................... 536/84 |
| 4,663,159 | A | * | 5/1987 | Brode et al. ............... 424/70.13 |
| 4,767,463 | A | * | 8/1988 | Brode et al. ............... 106/162.2 |
| 4,784,693 | A | | 11/1988 | Kirkland et al. |
| 4,892,589 | A | | 1/1990 | Kirkland et al. |
| 5,407,919 | A | | 4/1995 | Brode et al. |
| 5,583,214 | A | * | 12/1996 | Partain, III ...................... 536/84 |
| 6,306,933 | B1 | * | 10/2001 | Eiger et al. .................... 523/205 |
| 6,372,901 | B1 | * | 4/2002 | Partain, III et al. ............. 536/90 |
| 2003/0139297 | A1 | * | 7/2003 | Quintero ....................... 507/100 |
| 2005/0139130 | A1 | * | 6/2005 | Partain, III et al. .......... 106/730 |
| 2005/0178546 | A1 | * | 8/2005 | Reddy et al. .................. 166/278 |
| 2007/0031362 | A1 | | 2/2007 | Kreeger et al. |
| 2010/0204068 | A1 | * | 8/2010 | Kesavan et al. ............... 507/211 |

OTHER PUBLICATIONS

Glass, Polymers in Aqueous Media, Sau and Landoll, ACS 223, Chapter 18.
Zhang, Cellulosic Associative Thickeners, Carbohydrate Polym., 45, 1-10 (2001).

* cited by examiner

*Primary Examiner* — John J Figueroa

(57) ABSTRACT

A cellulose ether having (i) one or more substituents selected from the group consisting of methyl, hydroxyethyl and hydroxypropyl, (ii) one or more hydrophobic substituents, and (iii) one or more cationic, tertiary amino, or anionic substituents, and having a retained dynamic viscosity, $\%\eta_{80/25}$, of at least 30 percent, wherein $\%\eta_{80/25}$=[dynamic solution viscosity at 80° C./dynamic solution viscosity at 25° C.]×100, the dynamic solution viscosity at 25° C. and 80° being measured as 1% aqueous solution, is useful for modifying the viscosity of a composition selected from the group consisting of wellbore servicing fluids, cementitious formulations, ceramics, metal working fluids and cutting fluids.

12 Claims, No Drawings

WELLBORE SERVICING FLUID COMPRISING A CELLULOSE ETHER

FIELD OF THE INVENTION

This invention relates to compositions selected from the group consisting of cementitious formulations, ceramics, metal working fluids and cutting fluids and in particular wellbore servicing fluids comprising a cellulose ether, to the use of a cellulose ether for modifying the viscosity of such compositions and to novel cellulose ethers.

BACKGROUND OF THE INVENTION

Water or hydrocarbons (e.g. oil and natural gas) in a water- or hydrocarbon-bearing zone can be reached by drilling a wellbore into the earth, either on land or under the sea, which penetrates into the aquifer or hydrocarbon-bearing formation. Such a wellbore can be used to produce water or hydrocarbons or as an injector well to inject fluid, e.g. water or gas, to drive the relevant fluids into a production wellbore. Typically such a wellbore must be drilled deep into the earth. Usually the greater the depth of the well, the higher the natural temperature of the formation.

After drilling an open hole, the next step is referred to as "completing" the wellbore. A wellbore is sometimes completed openhole, that is, without cemented casing in place adjacent to the producing formations. More typically, however, as part of the well completion process, a metal pipe, known as "casing" is positioned and cemented into place in the openhole. Where the wellbore penetrates into a hydrocarbon- or water-bearing zone of a subterranean formation, the casing can be perforated to allow fluid communication between the zone and the wellbore. A zone of a wellbore that penetrates a hydrocarbon-bearing zone that is capable of producing hydrocarbons is referred to as "production zone". The casing also enables separation or isolation of one or more production zones of the wellbore, for example, by using downhole tools such as packers or plugs, or by using other techniques, such as forming sand plugs or placing cement in the perforations.

Whether the wellbore is openhole or cased, various procedures are often employed to complete the wellbore in preparation for production of hydrocarbons or recovery of water. For example, one common procedure is gravel packing to help prevent sand and fines from flowing with the hydrocarbon produced into the wellbore. Another example of a common procedure to stimulate the flow of hydrocarbon production from the hydrocarbon-bearing zones is hydraulic fracturing of a formation. This procedure is often referred to as "fracking" to provide improved flow path for hydrocarbons to flow from the hydrocarbon-bearing formation to the wellbore.

After a well has been completed and placed into production, from time to time it is helpful to workover a well by performing major maintenance or remedial treatments. Workover includes the stimulation and remediation of a well to help restore, prolong, or enhance the production of hydrocarbons or the recovery of water. During well servicing or workover, various treatment procedures may be used, including for example, gravel packing or hydraulic fracturing.

All these procedures, from drilling the wellbore, to cementing, to completion, to workover, employ appropriate fluids. During the initial drilling and construction of the wellbore, the fluids are often referred to as treatment fluids, completion fluids, or workover fluids. As used herein, "treatment fluid" includes any appropriate fluid to be introduced into a wellbore, whether during drilling, completion, servicing, workover or any other such stage. These treatment fluids, often also called "servicing fluid" typically are water-based fluids comprising a rheology modifier and/or a fluid loss modifier.

A wide variety of water-soluble or water-swellable polymers, such as cellulose ethers, starches, guar gums, xanthan gums, and synthetic polymers and copolymers of acrylamide, acrylic acid, acrylonitrile, and 2-acrylamido-2-methylpropanesulfonic acid are used in water-based servicing fluids.

U.S. Pat. No. 4,784,693 discloses the use of hydrophobically modified hydroxyethyl cellulose having 2-4 weight percent hydrophobic substitution, an MS (hydroxyethoxyl) substitution of 1.5-4 and a viscosity of 300-500 cps, measured as a 1 wt.-% aqueous solution, for use in oil drillings.

U.S. Pat. No. 4,529,523 discloses the use of hydrophobically modified cellulose ethers, such as hydroxyethyl cellulose having about 1 weight percent hydrophobic substitution, an MS (hydroxyethoxyl) substitution of 2.5 and molecular weights of 50,000-1,000,000, preferably about 150,000-800,000, as water flooding medium.

U.S. Pat. No. 4,228,277 discloses a nonionic hydroxyethyl or hydroxypropyl cellulose ether being substituted with a long chain alkyl radical having 10 to 24 carbon atoms in an amount between about 0.2 weight percent and the amount which renders the cellulose ether less than 1% by weight soluble in water. The products are said to exhibit improved viscosifying effect compared to their unmodified cellulose ether counterparts.

U.S. Pat. No. 4,892,589 discloses a cementing composition comprising hydraulic cement and, as a fluid loss agent, water-soluble, non-ionic hydrophobically modified hydroxyethyl cellulose.

U.S. Pat. No. 5,407,919 discloses a double-substituted, cationic water-soluble cellulose ether with hydrophobe-modification with alkyl groups of 8 to 18 carbon atoms and with a cationic substitution with a trimethyl- or triethylammonium group. The molecular weight of this cationic hydrophobe-modified hydroxyethyl cellulose is described as 10,000 to 500,000 Daltons. The cationic hydrophobe-modified hydroxyethyl cellulose polymers described in this patent are useful in cosmetic, personal care, and pharmaceutical applications.

US patent application 2007/0031362 A1 discloses a double-substituted, cationic water-soluble cellulose ether with hydrophobe-modification with alkyl groups of 8 to 18 carbon atoms and with the cationic substitution with a trimethyl- or triethylammonium group. The degree of polymerization of this cationic hydrophobe-modified hydroxyethyl cellulose is described as 4,000 to 10,000. The cationic hydrophobe-modified hydroxyethyl cellulose polymers described in this patent are useful in cosmetic, personal care, and pharmaceutical applications.

As the world's demand for hydrocarbons such as petroleum and natural gas continues to grow while known reserves are depleted, wells of increased depth are drilled. The deeper the drilled well is, the higher generally is the temperature of the subterranean formation. Unfortunately, many of the known water-soluble or water-swellable polymers used as rheology modifiers and/or a fluid loss modifiers used in water-based servicing fluids exhibit a reversible loss of viscosity at elevated temperatures, also known as thermal thinning. However, in many end-use applications, such as water, petroleum and natural gas recovery (e.g., drilling fluids, workover fluids, or completion fluids, cementing wells, hydraulic fracturing, and enhanced oil recovery), construction (e.g., concrete pumping and casting, self-leveling cement, cementing geothermal wells, extruded concrete panels), full-depth road reclamation, ceramics (e.g., as green strength additive), metal working and cutting fluids, thermal thinning is highly undesirable. One specific unmet need in the hydrocarbon recovery industry is for water-soluble polymers with improved high temperature viscosity retention down-hole. Temperatures down-hole can exceed 250° F. (120° C.), and most oil-field applications of water-soluble polymers depend on the solid suspending efficiency of these polymer solutions at these elevated temperatures. Accordingly, it would be desirable to find new cellulose ethers which exhibit a reduced degree of thermal thinning and thus would be more efficient thickeners at elevated temperatures.

SUMMARY OF THE INVENTION

Surprisingly, it has been found that certain ionic hydrophobe-modified cellulose ethers show an increased stability against thermal thinning.

Accordingly, one aspect of the present invention is a cellulose ether having
(i) one or more substituents selected from the group consisting of methyl, hydroxyethyl and hydroxypropyl,
(ii) one or more hydrophobic substituents, and
(iii) one or more cationic, tertiary amino, or anionic substituents, and having a retained dynamic viscosity, $\%\eta_{80/25}$, of at least 30 percent, wherein $\%\eta_{80/25}$=[dynamic solution viscosity at 80° C./dynamic solution viscosity at 25° C.]×100, the dynamic solution viscosity at 25° C. and 80° being measured as 1% aqueous solution.

Another aspect of the present invention is a composition selected from the group consisting of wellbore servicing fluids, cementitious formulations, ceramics, metal working fluids and cutting fluids comprising a cellulose ether having
(i) one or more substituents selected from the group consisting of methyl, hydroxyethyl and hydroxypropyl,
(ii) one or more hydrophobic substituents, and
(iii) one or more cationic, tertiary amino, or anionic substituents.

Another aspect of the present invention is the use of a cellulose ether having
(i) one or more substituents selected from the group consisting of methyl, hydroxyethyl and hydroxypropyl,
(ii) one or more hydrophobic substituents, and
(iii) one or more cationic, tertiary amino, or anionic substituents,
for modifying the viscosity of a composition selected from the group consisting of wellbore servicing fluids, cementitious formulations, ceramics, metal working fluids and cutting fluids.

Yet another aspect of the present invention is a method of modifying the viscosity of a composition selected from the group consisting of wellbore servicing fluids, cementitious formulations, ceramics, metal working fluids and cutting fluids which comprises the step of incorporating into the servicing fluid a cellulose ether having
(i) one or more substituents selected from the group consisting of methyl, hydroxyethyl and hydroxypropyl,
(ii) one or more hydrophobic substituents, and
(iii) one or more cationic, tertiary amino, or anionic substituents.

DETAILED DESCRIPTION OF THE INVENTION

The cellulose ether of the present invention and the cellulose ether used in the composition of the present invention has (i) one or more substituents selected from the group consisting of methyl, hydroxyethyl and hydroxypropyl,
(ii) one or more hydrophobic substituents, and
(iii) one or more cationic, tertiary amino, or anionic substituents.

Cellulose ethers suitable for preparing the cellulose ether of the present invention include hydroxyethyl cellulose, hydroxypropyl cellulose, methyl cellulose, hydroxypropyl methyl cellulose or hydroxyethyl methyl cellulose. Preferred cellulose ethers include hydroxyethyl cellulose and hydroxyethyl methyl cellulose. The most preferred cellulose ethers suitable for preparing the cellulose ethers of the present invention comprise hydroxyethyl groups.

The amount of the methyl, hydroxyethyl or hydroxypropyl groups is not very critical as long as there is a sufficient level to assure that the cellulose ether is water-soluble. The hydroxyethyl molar substitution EO MS (ethylene oxide molar substitution) of the polymers prepared from hydroxyethyl cellulose is determined either by simple mass gain or using the Morgan modification of the Zeisel method: P. W. Morgan, *Ind. Eng. Chem., Anal. Ed.*, 18, 500-504 (1946). The procedure is also described in ASTM method D-2364. The EO MS of the cellulose ether of the present invention generally is from 1 to 5, preferably from 1.5 to 3.5, more preferably from 1.6 to 2.5, most preferably from 1.9 to 2.5.

The cellulose ether of the present invention and used in the composition of the present invention is further substituted with one or more hydrophobic substituents, preferably with acyclic or cyclic, saturated or unsaturated, branched or linear hydrocarbon groups, such as an alkyl, alkylaryl or arylalkyl group having at least 8 carbon atoms, generally from 8 to 32 carbon atoms, preferably from 10 to 30 carbon atoms, more preferably from 12 to 24 carbon atoms, and most preferably from 12 to 18 carbon atoms. As used herein the terms "arylalkyl group" and "alkylaryl group" mean groups containing both aromatic and aliphatic structures. The most preferred aliphatic hydrophobic substituent is the hexadecyl group, which is most preferably straight-chained. The hydrophobic substituent is non-ionic.

The average number of moles of the hydrophobic substituent(s) per mole of anhydroglucose unit is designated as hydrophobe DS (hydrophobe degree of substitution). The hydrophobe DS is measured using the Morgan modification of the Zeisel method as described above, but using a gas chromatograph to measure the concentration of cleaved alkyl groups. In the case of alkylaryl hydrophobes such as dodecylphenyl glycidyl ether, the spectrophotometric method described in U.S. Pat. No. 6,372,901 issued Apr. 16, 2002 can be used to determine the hydrophobe DS. The hydrophobe DS is generally at least 0.005, preferably at least 0.007, more preferably at least 0.010, most preferably at least 0.012, and in particular at least 0.015 moles of the hydrophobic substituent(s), per mole of anhydroglucose unit. The average substitution level of the hydrophobic substituent(s) is generally up to 0.025, typically up to 0.018. With increasing hydrophobe substitution, a point is reached at which the resulting polymer is water-insoluble. However, if the point of water-insolubility due to hydrophobe substitution is exceeded, further modification of the polymer with ionic functionality such as cationic or anionic groups will render the polymer soluble in water ("re-solubilize" the polymer) without adversely affecting the desired elevated temperature rheology and reduction in thermal thinning behavior. As noted in examples 1-5, for an HmHEC polymer containing a hexadecyl group, the HmHEC polymer was rendered water-insoluble at a hydrophobe substitution of above 0.0125. This upper limit varies depending on the specific hydrophobe used, the molecular weight of the cellulosic backbone, and the method in which the hydrophobe is added. More than one type of hydrophobic substituent can be substituted onto the cellulose ether, but the total substitution level is preferably within the ranges set forth above.

The cellulose ether of the present invention and used in the composition of the present invention further comprises one or more cationic, tertiary amino, or anionic substituents.

Preferred cationic groups are represented by formula I

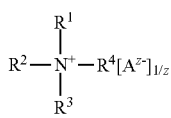
(I)

wherein
$R^1$, $R^2$ and $R^3$ each independently are $CH_3$, $C_2H_5$, or $C_3H_7$,
$R^4$ is $CH_2$—CHOH—$CH_2$— or $CH_2CH_2$—,
$A^{z-}$ is an anion, and z is 1, 2 or 3.

Preferably, $R^1$, $R^2$, and $R^3$ are methyl or ethyl. More preferably, $R^1$, $R^2$ and $R^3$ are methyl. $A^{z-}$ is an anion with the valency of z, such as phosphate, nitrate, sulfate or halide. A halide, particularly chloride, is most preferred. Z is preferably 1 or 2, more preferably 1. The most preferred cationic substituents of the formula I are those wherein two or more, preferably each of $R^1$, $R^2$, $R^3$, $R^4$, $A^{z-}$ and z have the mentioned preferred meanings.

Preferred tertiary amino groups are represented by formula II

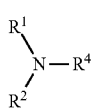
(II)

wherein
$R^1$ and $R^2$ each independently are $CH_3$, $C_2H_5$, or $C_3H_7$,
$R^4$ is $CH_2$—CHOH—$CH_2$— or $CH_2CH_2$—.

Preferably, $R^1$ and $R^2$ are methyl. More preferably, $R^1$ and $R^2$ are ethyl. Preferably, $R^4$ is $CH_2$—CHOH—$CH_2$— or more preferably $CH_2$—$CH_2$—. Under pH conditions other than strongly alkaline conditions, this tertiary amino functionality would be protonated and would therefore function as a nascent cationic group. The cellulose ether of the present invention preferably comprises dimethylamino, diethylamino, or diisopropylamino groups.

Preferred anionic groups are represented by formula III

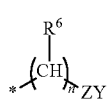
(III)

wherein n is 1, 2, 3, or 4,
$R^6$ is either H or OH,
Z is an anionic functionality, preferably $CO_2$—, $SO_3$—, $C_6H_4SO_3$—, $SO_4$—, or $PO_4$—, and
Y is the cationic counterion to the anionic group, preferably $Na^+$, $Li^+$, $K^+$, $NH_4^+$, $Ca^{+2}$ or $Mg^{+2}$.

Other preferred anionic groups are represented by formula IV

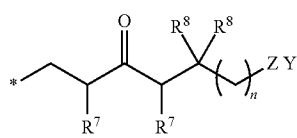
(IV)

wherein n is 1, 2, 3, or 4,
$R^7$ is either H or $CH_3$,
$R^8$ is either H or $CH_3$ or $CH_2CH_3$,
Z is an anionic functionality, preferably $CO_2$—, $SO_3$—, $C_6H_4SO_3$—, $SO_4$—, or $PO_4$—, and
Y is the cationic counterion to the anionic group, preferably $Na^+$, $Li^+$, $K^+$, $NH_4^+$, $Ca^{+2}$ or $Mg^{+2}$.

If the cellulose ether of the present invention comprises cationic groups, it preferably comprises from 0.2 to 2.5 percent, more preferably from 0.4 to 1.0 percent of cationic nitrogen, based on the total weight of the cellulose ether. More than one particular cationic substituent of the formula I can be substituted onto the cellulose ether, but the total substitution level is preferably within the ranges set forth above. The percentage of cationic nitrogen is determined by analytical determination of the average weight percent of nitrogen per anhydroglucose repeat unit using an automated Buchi Kjeldahl distillation unit and titrating with an automated titrimeter.

If the cellulose ether of the present invention comprises tertiary amino groups, for example in the case of a dialkylamino cellulose ether comprising one or more hydrophobic substituents, the cellulose ether of the present invention preferably comprises from 0.2 to 2.5 percent, more preferably from 0.4 to 1.0 percent of tertiary nitrogen, based on the total weight of the cellulose ether. More than one particular tertiary nitrogen substituent of the formula II can be substituted onto the cellulose ether, but the total substitution level is preferably within the ranges set forth above. The percentage of tertiary nitrogen is determined by analytical determination of the average weight percent of nitrogen per anhydroglucose repeat unit using an automated Buchi Kjeldahl distillation unit and titrating with an automated titrimeter.

Methods for preparing cationic substituents of the formula I, as well as methods for derivatizing cellulose ethers to comprise such cationic substituents, are known to those skilled in the art, note for example WO 01/48021 A1.

The cellulose ether of the present invention is generally water-soluble. As used herein, the term "water-soluble" means that at least 1 gram, and preferably at least 2 grams of the cellulose ether is soluble in 100 grams of distilled water at 25° C. and 1 atmosphere. The extent of water-solubility can be varied by adjusting the extent of ether substitution on the cellulose ether and the number of anhydroglucose repeat units. Techniques for varying the water solubility of cellulose ethers are known to those skilled in the art.

The cellulose ether of the present invention can be substituted with one or more anionic substituents instead of one or more cationic or tertiary amino substituents. Preferred anionic substituents include the carboxymethyl, carboxyethyl, sulfo-$C_{1-6}$-alkyl groups, such as sulfoethyl, sulfopropyl, sulfobutyl, sulfophenyl ethyl groups and (meth)acrylamidoalkyl sulfonates wherein the alkyl group preferably has 1 to 8, more preferably 1 to 6, most preferably 1 to 4 carbon atoms. If the cellulose ether of the present invention comprises carboxymethyl or carboxyethyl groups, the carboxymethyl or carboxyethyl degree of substitution (DS) preferably is from 0.1 to 1.8, more preferably from 0.3 to 0.7. The carboxymethyl or carboxyethyl DS is determined by non-aqueous titration as described in ASTM method D-1439. If the cellulose ether of the present invention comprises sulfo-$C_{1-6}$-alkyl groups, such as sulfoethyl or sulfopropyl groups, the sulfo-$C_{1-6}$-alkyl, such as sulfoethyl or sulfopropyl degree of substitution (DS) preferably is from 0.1 to 0.8, more preferably from 0.15 to 0.35. The sulfo-$C_{1-6}$-alkyl, such as sulfoethyl or sulfopropyl DS is determined by elemental sulfur analysis.

Most water-soluble polymers, including the cellulose ether polymers of this invention, are usually described as viscoelastic, which means that the flow properties of the polymer solutions exhibit components of both viscous and elastic flow. The viscous component is often characterized using the loss modulus which is related to the energy loss in the solution under shear stress, while the elastic component is often characterized using the storage modulus which is related to the energy stored in the solution under shear stress. In an oscillatory experiment, the retained dynamic viscosity is determined by dividing the loss modulus by the frequency of oscillation (in radians).

The retained dynamic viscosity $\%\eta_{80/25}$ is at least 30 percent, preferably at least 35 percent, more preferably at least 40 percent, and most preferably at least 60 percent, wherein $\%\eta_{80/25}$=[dynamic solution viscosity at 80° C./dynamic solution viscosity at 25° C.]×100, the dynamic solution viscosity at 25° C. and 80° being measured as 1% aqueous solution. The dynamic viscosity is measured at 25° C. and at 80° C. respectively using a TA Instruments AR-2000 oscillatory rheometer with a Couette geometry, a frequency of 0.5 Hertz, an applied stress of 0.1809 Pascals, and a heat-up ramp rate of 2° C./minute. It has been found that according to the present invention generally a retained dynamic viscosity $\%\eta_{80/25}$ of over 90 percent can be achieved. The dynamic viscosity is a measure of the resistance of a fluid to flow while being subjected to an oscillatory shear stress deformation. In many applications, water-soluble polymers are employed to thicken aqueous systems to permit the suspension of a variety of particulate matter. By the Stokes equation (see for example *Principles of Colloid and Surface Science*, by P. C. Hiemenz, Marcel Dekker, New York, 1977, ISBN 0-8247-6573-7), the settling rate of any particulate suspended in a fluid is inversely proportional to the viscosity of the fluid. Consequently, higher fluid viscosities mean slower settling rates and therefore higher suspending capacities. In many water-soluble polymer applications, in which high suspending capability is a key performance attribute, higher viscosities are preferred. Examples of such applications include water, petroleum and natural gas recovery (e.g., servicing fluids, such as drilling fluids, workover fluids, or completion fluids; cementing wells, and hydraulic fracturing), construction (e.g., concrete pumping and casting, self-leveling cement, cementing geothermal wells, extruded concrete panels), full-depth road reclamation, ceramics (e.g., as green strength additive), metal working and cutting fluids. However, as noted earlier, many water-soluble polymers exhibit thermal thinning, which is the significant decrease of viscosity at elevated temperature. The loss of viscosity at elevated temperature would result in a loss of suspending power at elevated temperature, which in turn results in a degradation in performance in any application for which a water-soluble polymer is being employed to thicken an aqueous continuous phase, especially when the suspension of particulate matter is an important performance attribute. A high retained dynamic viscosity $\%\eta_{80/25}$ is therefore a measure of the retention of the suspending capability of the water-soluble polymer solution at elevated temperature.

The cellulose ether of the present invention and used in the servicing fluid of the present invention preferably further has a Brookfield viscosity of at least about 6000 mPa-sec, preferably at least 10,000 mPa-sec, more preferably at least 15,000 mPa-sec, most preferably at least 20,000 mPa-sec and in particular at least 30,000 mPa-sec. The Brookfield viscosity is measured as 1% aqueous solution at 6 rpm, spindle #4 at 25° C. on a Brookfield viscometer.

The cellulose ether of the present invention preferably has a weight average molecular weight of at least 750,000, more preferably at least 1,000,000. The weight average molecular weight is preferably up to 2,000,000, more preferably up to 1,300,000. The weight average molecular weight is measured by size-exclusion chromatography (SEC) using the procedure described below.

The cellulose ethers of the present invention can be produced in two ways:

According to a first method the cellulose ethers of the present invention can be produced by reacting a cellulose ether having one or more substituents selected from the group consisting of methyl, hydroxyethyl, and hydroxypropyl with (a) a compound having a hydrophobic substituent, for example a glycidyl ether, an alpha-olefin epoxide, or a halide having an acyclic or cyclic, saturated or unsaturated, branched or linear hydrocarbon group, such as an alkyl, alkylaryl or arylalkyl group having at least 8 carbon atoms; and (b) an agent providing a cationic, tertiary amino, or anionic substituent, preferably selected from the group consisting of (b1), (b2), (b3) and (b4) below:

(b1) a compound of formula V

 (V)

wherein $R^1$, $R^2$ and $R^3$ each independently are $CH_3-$, $C_2H_5-$, or $C_3H_7-$, $A^{z-}$ is an anion, and z is 1, 2 or 3, and $R^5$ is

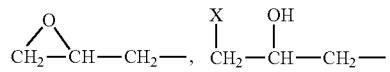

or $X-CH_2CH_2-$, wherein X is halide, preferably bromide or chloride; or (b2) a compound of the formula VI

 (VI)

wherein $R^1$ and $R^2$ are $CH_3-$, $C_2H_5-$, or $C_3H_7-$, and X is halide, preferably bromide or chloride; or (b3) a compound of the formula VII

 (VII)

wherein

Z is an anionic functionality, preferably $CO_2$—, $SO_3$—, $C_6H_4SO_3$—, $SO_4$—, or $PO_4$—, and $R^5$ is

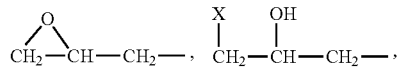

$CH_2$—$CH$—$CH_2$—, $CH_2$—$CH$—$CH_2$—, $CH_2$=$CH$—,
$X$—$CH_2$—, $X$—$CH_2CH_2$—, $X$—$CH_2CH_2CH_2$—,
$CH_2$=$CR^6$—$CO$—$NR^6$—$C(R^7)_2$—$(CH_2)_n$— wherein
$R^6$ is H or $CH_3$, $R^7$ is H or $CH_3$ or $CH_2CH_3$, and n=1, 2, 3, or 4 or $X$—$CH_2CH_2CH_2CH_2$— wherein X is halide, preferably bromide or chloride, and Y is the cationic counterion to the anionic group, preferably $Na^+$, $Li^+$, $K^+$, $NH_4^+$, $Ca^{+2}$ or $Mg^{+2}$, or (b4) a compound of the formula VIII

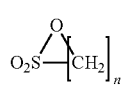

(VIII)

wherein n is 2, 3, 4 or 5.

The compounds (a) and (b) can be reacted with the cellulose ether in any order. That is, the compound (a) can be reacted with the cellulose ether prior to, subsequent to, or simultaneously with the compound (b) in a known manner. Preferably, the reaction is carried out as described in U.S. Pat. No. 5,407,919 and in International Patent Application WO 2005/000903 while adapting the molar ratio between the cellulose ether and the compounds (a) and (b) to the desired substitution levels. Preferably, the molar ratio between the compound (a) and the anhydroglucose units of the cellulose ether is from 0.10 to 1.25, more preferably from 0.20 to 0.75. Preferably, the molar ratio between the compound (b) and the anhydroglucose units of the cellulose ether is from 0.05 to 1.5, more preferably from 0.25 to 0.90.

According to a second method, cellulose is reacted with alkali metal hydroxide to prepare alkali cellulose and the produced alkali cellulose is reacted with i) an etherifying agent providing a methyl, hydroxyethyl, or hydroxypropyl substituent, preferably methyl chloride, ethylene oxide, or propylene oxide or a combination thereof, ii) with a compound (a) having a hydrophobic substituent and iii) with a compound (b) providing a cationic, tertiary amino, or anionic substituent in sequence or simultaneously.

Many hydrophobe-containing reagents suitable as compounds (a) are commercially available. In addition, methods for preparing such hydrophobe-containing reagents, as well as methods for derivatizing cellulose ethers to comprise such hydrophobic substituents, are known to those skilled in the art. Note for example, U.S. Pat. No. 4,228,277 issued Oct. 14, 1980, U.S. Pat. No. 4,663,159, issued May 5, 1987 and U.S. Pat. No. 4,845,175, issued Jul. 4, 1989.

Preferred hydrophobic substituents include those derived from hydrophobe-containing reagents comprising acyclic or cyclic, saturated or unsaturated, branched or linear hydrocarbon groups having at least 8 carbon atoms, preferably those described further above. The hydrophobe-containing reagent can be attached to the cellulose or to the cellulose ether having one or more substituents selected from the group consisting of methyl, hydroxyethyl and hydroxypropyl via an ether, ester or urethane linkage. Preferred is the ether linkage. Preferred are glycidyl ethers, such as nonylphenyl glycidyl ether, dodecylphenyl glycidyl ether, or 3-n-pentadecenylphenyl glycidyl ether, hexadecyl glycidyl ether, octadecyl glycidyl ether, or docosyl glycidyl ether; or alpha-olefin epoxides, such as 1,2-epoxy hexadecane, 1,2-epxoyocatdecane, and their respective chlorohydrins, or alkyl halides, such as octyl bromide, decyl bromide, dodecyl bromide, tetradecyl bromide, hexadecyl bromide, octadecyl bromide, eicosyl bromide; and mixtures thereof.

According to the first method, a cellulose ether having one or more substituents selected from the group consisting of methyl, hydroxyethyl and hydroxypropyl is typically first reacted with an alkali metal hydroxide and then with a hydrophobe-containing reagent (a) and a compound (b) providing a cationic, tertiary amino, or anionic substituent. The first method is described hereafter in detail using hydroxyethyl cellulose as an example of a cellulose ether having one or more substituents selected from the group consisting of methyl, hydroxyethyl and hydroxypropyl, although the procedure is not limited to hydroxyethyl cellulose. Preferably a slurry is prepared of hydroxyethyl cellulose, in a diluent, preferably an organic solvent such as methanol, ethanol, n-propyl alcohol, isopropyl alcohol, sec-butyl alcohol, t-butyl alcohol, tetrahydrofuran, 1,4-dioxane, dimethyl ether, toluene, cyclohexane, cyclohexanone, or methyl ethyl ketone. The diluent optionally comprises water. The water content of the diluent is typically from 0 to 25%, by weight. Preferably a hydroxyethyl cellulose is used which has an EO MS of from 1 to 5, more preferably from 1.5 to 3.5, most preferably from 1.6 to 2.5, measured as further described above, and a Brookfield viscosity of from 1000 mPa-sec to 20,000 mPa-sec, preferably from 2000 mPa-sec to 10,000 mPa-sec, more preferably from 4000 mPa-sec to 8000 mPa-sec, measured as 1% aqueous solution at 30 rpm, spindle #3 or #4 (depending on the solution viscosity) on a Brookfield viscometer at 25° C. The weight ratio of the diluent to hydroxyethyl cellulose is preferably from 3 to 20, more preferably from 5 to 10. The slurry of the hydroxyethyl cellulose is contacted with an alkali metal hydroxide, such as sodium hydroxide or potassium hydroxide, preferably with an alkali metal hydroxide in aqueous solution, preferably with a 15 to 50 wt.-% sodium hydroxide solution, particularly preferably with a 20 to 50 wt.-% sodium hydroxide solution. Generally from 0.1 to 1.5, preferably from 0.3 to 1.0 moles of alkali metal hydroxide are utilized, per mole of anhydroglucose unit of the hydroxyethyl cellulose. Generally the alkalization is carried out at a temperature of 10 to 40° C., preferably from 20 to 30° C., and for 15 to 60 minutes, preferably from 25 to 45 minutes. Subsequently the alkalized hydroxyethyl cellulose is reacted with a hydrophobe-containing reagent (a) and with compound b) described further above. Preferably from 0.10 to 1.25, more preferably from 0.20 to 0.75 moles of hydrophobe-containing reagent (a) are utilized, per mole of anhydroglucose unit of the hydroxyethyl cellulose. Generally the reaction with the hydrophobe-containing reagent is carried out at a temperature of from 50 to 120° C., preferably from 70 to 85° C., and for 120 to 600 minutes, preferably from 180 to 300 minutes. Preferably from 0.05 to 1.5, more preferably from 0.25 to 0.90 moles of compound b) are utilized, per mole of anhydroglucose unit of the hydroxyethyl cellulose. Generally the reaction with compound b) is carried out at a temperature of 25° C. to 120° C., preferably from 40° C. to 80° C., and for 60 to 300 minutes, preferably from 90 to 180 minutes.

According to the second method cellulose is reacted with an alkali metal hydroxide to prepare alkali cellulose; and the intermediate alkali cellulose is reacted with i) an etherifying agent providing a methyl, hydroxyethyl, or hydroxypropyl substituent, preferably methyl chloride, ethylene oxide, or propylene oxide or a combination thereof, more preferably with ethylene oxide, and with a hydrophobe-containing reagent (a) and with a compound (b) providing a cationic, tertiary amino, or anionic substituent, preferably with a of formula V, VI, VII or VIII, in sequence or simultaneously. The cellulose (cotton linters or wood pulp) preferably has a weight average molecular weight of from 750,000 to 3,000,000, more preferably from 1,000,000 to 2,000,000 Daltons. Preferably a slurry is prepared of cellulose in a diluent, preferably an organic solvent such as methanol, ethanol, n-propyl alcohol, isopropyl alcohol, sec-butyl alcohol, t-butyl alcohol, tetrahydrofuran, 1,4-dioxane, dimethyl ether, toluene, cyclohexane, cyclohexanone, or methyl ethyl ketone. The diluent optionally comprises water. The water content of the diluent is typically from 0 to 25%, by weight. The weight ratio of the diluent to cellulose is preferably from 3 to 30, more preferably from 10 to 20. The slurry of the cellulose is contacted with an alkali metal hydroxide, such as sodium hydroxide or potassium hydroxide, preferably with an alkali metal hydroxide in aqueous solution, preferably with a 15 to 50 wt.-% sodium hydroxide solution, particularly preferably with a 20 to 50 wt.-% sodium hydroxide solution. Generally from 0.2 to 2.0, preferably from 1.0 to 1.5 moles of alkali metal hydroxide are utilized, per mole of anhydroglucose unit of the cellulose. Generally the alkalization is carried out at a temperature of 10 to 40° C., preferably from 20 to 30° C., and for 15 to 60 minutes, preferably from 25 to 45 minutes. Subsequently the alkalized cellulose is reacted with an etherifying agent providing a methyl, hydroxyethyl, or hydroxypropyl substituent, preferably methyl chloride, ethylene oxide, or propylene oxide or a combination thereof, more preferably ethylene oxide. Preferably from 2 to 8, more preferably from 4 to 6 moles of the etherifying agent, such as ethylene oxide are utilized, per mole of anhydroglucose unit of the cellulose. Generally the reaction with the etherifying agent, such as ethylene oxide is carried out at a temperature of 40 to 120° C., preferably from 70 to 85° C., and for 30 to 180 minutes, preferably from 60 to 120 minutes. Although the entire amount of the etherifying agent, such as ethylene oxide can be added to alkali cellulose in one stage, it can be added in two stages, with an intermittent adjustment in the caustic concentration if desired. Most preferably a partial neutralization of the slurry with an acid, such as acetic acid, formic acid, nitric acid, phosphoric acid, or lactic acid is conducted prior to the addition of the hydrophobe-containing reagent (a). Generally sufficient acid is added to adjust the caustic concentration of the slurry to 0.10 to 1.00 moles, more preferably from 0.30 to 0.70 moles of alkali metal hydroxide per mole of anhydroglucose unit of the cellulose. The hydrophobe-containing reagent reacts much slower with the alkali cellulose than the etherifying agent, such as ethylene oxide. The hydrophobe-containing reagent can be added to the alkali cellulose simultaneously with the etherifying agent, such as ethylene oxide, but preferably the hydrophobe-containing reagent is added only after the reaction with the etherifying agent, such as ethylene oxide is complete. Preferably from 0.10 to 2.0, more preferably from 0.4 to 1.0 moles of hydrophobe-containing reagent are utilized, per mole of anhydroglucose unit of the cellulose. Generally the reaction with the hydrophobe-containing reagent is carried out at a temperature of 50 to 120° C., preferably from 75 to 85° C., and for 120 to 600 minutes, preferably from 180 to 300 minutes. The compound of formula V, VI, VII or VIII can be added simultaneously with the hydrophobe-containing reagent, but preferably the compound of formula V, VI, VII or VIII is added after the hydrophobe reaction is complete. Preferably from 0.05 to 1.5, more preferably from 0.25 to 0.90 moles of compound of formula V, VI, VII or VIII are utilized, per mole of anhydroglucose unit of the cellulose. Generally the reaction with compound b) is carried out at a temperature of 25° C. to 120° C., preferably from 40° C. to 80° C., and for 60 to 300 minutes, preferably from 90 to 180 minutes.

Compounds a) and b) can be added to the alkali cellulose simultaneously with the ethylene oxide, but preferably compounds a) and b) are only added after the ethylene oxide. The moles of compounds a) and b) per mole of anhydroglucose unit of the cellulose, the reaction temperatures and the reaction times are preferably those described above for the first method of production.

After completion of the reaction according to the first or second method, the reaction mixture can be processed in a known manner, such as neutralization of residual alkali with a suitable acid such as acetic acid, formic acid, hydrochloric acid, nitric acid, or phosphoric acid, recovering the product, washing it with an inert diluent to remove unwanted by-products, and drying the product.

The ionic or tertiary-amine substituted cellulose ethers of the present invention are useful in a variety of applications for modifying the viscosity of fluids, for example in water, petroleum and natural gas recovery (e.g., servicing fluids, such as drilling fluids, workover fluids, or completion fluids; cementing wells, hydraulic fracturing, and enhanced oil recovery), construction (e.g., concrete pumping and casting, self-leveling cement, cementing geothermal wells, extruded concrete panels), full-depth road reclamation, ceramics (e.g., as green strength additive), metal working and cutting fluids. The inventive polymers exhibit unexpectedly high retention of dynamic solution viscosity at elevated temperatures. This reduced degree of thermal thinning is a desirable property in a variety of commercial applications employing cellulose ethers as thickeners or rheology modifiers, especially in situations where the operation or product will be exposed to elevated temperatures and little or no loss in viscosity is desired. The viscosified—fluid preferably has a temperature of at least 60° C., more preferably at least 80° C.

The present invention is further illustrated by the following examples which are not to be construed to limit the scope of the present invention. Unless otherwise indicated, all percentages and parts are by weight.

Examples 1-15 and A-K

Measurement of Retained Dynamic Viscosity $\%\eta_{80/25}$

A TA Instruments AR-2000 oscillatory rheometer fitted with a cup and bob (Couette) geometry was used to measure the solution viscosity of various polymer solutions at elevated temperatures. The temperature was ramped up from 25.0° C. to 100.0° C. at a rate of 2.0° C./minute, with the fixed frequency of 0.5 Hz and the fixed applied stress of 0.1809 Pa (10 µN-m). The storage & loss moduli and phase angle of 1% aqueous solutions of selected cellulose ethers measured by the rheometer were recorded as a function of temperature. To evaluate the data, the dynamic solution viscosities ($\eta'$) at 25° C. and 80° C. were calculated by dividing the loss modulus by the frequency ($\eta'=G''/\omega$, where $\omega=\pi$ radians/second). The percent retained dynamic viscosity at 80° C. ($\%\eta_{80/25}$) is obtained by dividing the dynamic solution viscosity at 80° C. by the dynamic solution viscosity at 25° C., and expressing the result as a percent.

Measurement of Molecular Weight by Size-Exclusion Chromatography (SEC):

Mobile Phase

The eluent consists of 0.05 wt % sodium azide (NaN$_3$) and 0.75 wt % β-cyclodextrin (β-CD, purchased from Sigma-Aldrich) dissolved in deionized (DI) water. All eluent compositions were prepared by dissolving NaN$_3$ and β-CD in DI water that had been filtered through a 0.2 μm nylon cartridge. The mobile phase was filtered through a 0.2 μm nylon membrane prior to use.

Sample Preparation

Sample solutions were prepared in the mobile phase to minimize interference from any salt peak. The target sample concentration was about 0.3 mg/ml in order to be sufficiently below C*, the intermolecular polymer chain overlap concentration. Solutions were slowly shaken on a flat bed shaker for 2-3 hours to dissolve the samples, and then were stored overnight in a refrigerator set at 4° C. for complete hydration and dissolution. On the second day, solutions were shaken again for 1-2 hours. All solutions were filtered through a 0.45 μm nylon syringe filter prior to injection.

SEC Equipment

Pump: Waters 2690 set at 0.5 ml/min flow rate and equipped with a filter that consists of two layers of 0.2 μm nylon membrane installed upstream of the injection valve.

Injection: Waters 2690 programmed to inject 100 microliters of solution.

Columns: Two TSK-GEL GMPW columns (7.5 mm ID×30 cm, 17 μm particles, 100 Å to 1000 Å pores nominal) were operated at 30° C.

Detector: A Waters DRI detector 2410 was operated at 30° C.

Calibration

The conventional SEC calibration was determined using 11 narrow PEO standards (linear, narrow molecular weight PEO standards were purchased from TOSOH, Montgomeryville, Pa.). The calibration curve was fit to a first order polynomial over the range of 879 kg/mol to 1.47 kg/mol.

Software

Data were acquired and reduced using Cirrus SEC software version 2.0.

Production of the Cellulose Ethers

Comparative Examples 1-5

Preparation of Water-Insoluble, High Hydrophobe DS Hydrophobe-Modified Hydroxyethyl Cellulose (HmHEC)

Comparative Example 1

A 1000 ml resin kettle was fitted with a mechanical stirring paddle, a nitrogen inlet, a rubber serum cap, and a reflux condenser connected to a mineral oil bubbler. The resin kettle was charged with 66.56 g (60.00 g contained) CELLOSIZE® HEC QP-30000H, 346 g of isopropyl alcohol, and 54 g of distilled water. CELLOSIZE® HEC QP-30000H is a hydroxyethyl cellulose commercially available from The Dow Chemical Company. While stirring the mixture, the resin kettle was purged with nitrogen for one hour to remove any entrained oxygen in the system. While stirring under nitrogen, 8.00 g of 50% aqueous sodium hydroxide solution were added dropwise over five minutes using a syringe. The mixture was then allowed to stir for 30 minutes under nitrogen.

A solution of 17.50 g of 1-bromohexadecane in 20 mL of isopropyl alcohol was added by syringe to the mixture under nitrogen. Heat was then applied using a heating mantle, and the stirred mixture was refluxed for 4.5 hours under nitrogen. The mixture was then cooled to room temperature and neutralized by adding 10.00 g of glacial acetic acid and stirring for 10 minutes. The polymer was recovered by vacuum filtration and washed in a Waring blender: five times with 500 mL of 4:1 (by volume) of acetone/water and twice with 500 mL of pure acetone. The polymer was dried in vacuo at 50° C. overnight, yielding 63.36 g of an off-white powder with a volatiles content of 0.97% and an ash content (as sodium acetate) of 4.70%. The polymer was insoluble in water and was found to have a hexadecyl DS (by Zeisel analysis) of 0.0181.

Comparative Example 2 was prepared as described for Comparative Example 1 and was found to have a hexadecyl DS (by Zeisel analysis) of 0.0185. Comparative Example 3 was prepared as described for Comparative Example 1 and was found to have a hexadecyl DS (by Zeisel analysis) of 0.0175. Comparative Examples 4 and 5 were prepared as described for Comparative Example 1, but with different grades of the commercially available CELLOSIZE® HEC, as listed in Table 1.

Examples 6-8

Preparation of Cationic Hydrophobe-Modified Hydroxyethyl Cellulose

Example 7

A 500 ml resin kettle was fitted with a mechanical stirring paddle, a nitrogen inlet, a rubber serum cap, and a reflux condenser connected to a mineral oil bubbler. The resin kettle was charged with 20.00 g (contained) of the hydrophobe-modified hydroxyethyl cellulose of Example 1 (hexadecyl DS=0.0181), 99 g of isopropyl alcohol, and 21 g of distilled water. While stirring the mixture, the resin kettle was purged with nitrogen for one hour to remove any entrained oxygen in the system. While stirring under nitrogen, 2.20 g of 25% aqueous sodium hydroxide solution were added dropwise over five minutes using a syringe. The mixture was then allowed to stir for 30 minutes under nitrogen.

Using a syringe, 3.05 g of 70% aqueous glycidyl trimethylammonium chloride (GMAC) were added to the mixture under nitrogen. The mixture was heated to 55° C. and held at 55° C. with stirring under nitrogen for 1.5 hours. The mixture was then cooled to room temperature and neutralized by adding 1.20 g of glacial acetic acid and stirring for 10 minutes. The polymer was recovered by vacuum filtration and washed in a Waring blender: five times with 250 mL of 4:1 (by volume) of acetone/water and twice with 250 mL of pure acetone. The polymer was glyoxal-treated by adding 0.40 g of 40% aqueous glyoxal and 0.25 g of glacial acetic acid to the last acetone desiccation. The polymer was dried in vacuo at 50° C. overnight, yielding 21.37 g of an off-white powder with a volatiles content of 1.00% and an ash content (as sodium acetate) of 2.74%. The 1% aqueous viscosity of the cationic HmHEC polymer (corrected for ash and volatiles) was measured at 25.0° C. and found to be 65,300 cP (Brookfield LVT, 6 rpm, spindle #4). The hexadecyl DS was found to be 0.0181 by Zeisel analysis and the cationic substitution was found to be 0.53% (CS=0.100) by Kjeldahl analysis.

Example 6 was prepared in the same manner as Example 7 except that the hydrophobe-modified hydroxyethyl cellulose of Example 4 (hexadecyl DS=0.0145) was used. Example 8 was prepared in the same manner as Example 7 except that the hydrophobe-modified hydroxyethyl cellulose of Example 5 (hexadecyl DS=0.0125) was used.

Examples 9-11

Preparation of Sulfoethyl Hydrophobe-Modified Hydroxyethyl Cellulose

Example 10

A 250 ml three-necked round bottomed flask was fitted with a mechanical stirring paddle, a nitrogen inlet, a rubber serum cap, and a reflux condenser connected to a mineral oil bubbler. The resin kettle was charge with 15.89 g (15.00 g contained) of hydrophobe-modified hydroxyethyl cellulose of Example 2 (hexadecyl DS=0.0185), 87 g of isopropyl alcohol, and 13 g of distilled water. While stirring the mixture, the resin kettle was purged with nitrogen for one hour to remove any entrained oxygen in the system. While stiffing under nitrogen, 8.00 g of 50% aqueous sodium hydroxide solution were added dropwise over five minutes using a syringe. The mixture was then allowed to stir for 30 minutes under nitrogen.

The mixture was heated to reflux with stirring under nitrogen. At reflux, 7.50 g of 25% aqueous sodium vinyl sulfonate (SVS) solution were added by syringe dropwise over 5 minutes. The mixture was then held at reflux for three hours under nitrogen. The mixture was then cooled to room temperature and neutralized by adding 5.00 g of glacial acetic acid and stiffing for 10 minutes. The polymer was recovered by vacuum filtration and washed in a Waring blender: four times with 300 mL of 4:1 (by volume) of acetone/water and twice with 300 mL of pure acetone. The polymer was glyoxal-treated by adding 0.40 g of 40% aqueous glyoxal and 0.25 g of glacial acetic acid to the last acetone desiccation. The polymer was dried in vacuo at 50° C. overnight, yielding 17.11 g of an off-white powder with a volatiles content of 3.19% and an ash content (as sodium acetate) of 16.93%. The 1% aqueous viscosity of the sulfoethyl HmHEC polymer (corrected for volatiles only) was measured at 25.0° C. and found to be 39,500 cP (Brookfield LVT, 6 rpm, spindle #4). The sulfoethyl DS was found to be 0.177 (% S=2.076%) by elemental analysis.

Example 9 was prepared in the same manner as Example 10 except that the hydrophobe-modified hydroxyethyl cellulose of Example 4 (hexadecyl DS=0.0145) was used. Example 11 was prepared in the same manner as Example 10 except that the hydrophobe-modified hydroxyethyl cellulose of Example 5 (hexadecyl DS=0.0125) was used.

Example 12

Preparation of Diethylaminoethyl Hydrophobe-Modified Hydroxyethyl Cellulose

A 500 ml resin kettle was fitted with a mechanical stirring paddle, a nitrogen inlet, a rubber serum cap, a pressure-equalizing addition funnel, a thermometer, and a reflux condenser connected to a mineral oil bubbler. The resin kettle was charged with 20.00 g (contained) of the hydrophobe-modified hydroxyethyl cellulose of Example 3 (hexadecyl DS=0.0175) and 240 g of isopropyl alcohol. The addition funnel was charged with a solution of 12.4 g of N,N-diethylaminoethyl chloride hydrochloride (DEAEC) in 28.9 g of distilled water. While stirring the mixture, the resin kettle was purged with nitrogen for one hour to remove any entrained oxygen in the system. While stirring under nitrogen, the solution of N,N-diethylaminoethyl chloride hydrochloride was added dropwise to the slurry over 15 minutes, followed by the dropwise addition by syringe over 5 minutes of 8.17 g of 50% aqueous sodium hydroxide solution. Heat was applied to the slurry and the mixture was held at 40° C. for two hours. The mixture was then allowed to stir for 30 minutes under nitrogen.

The mixture was then cooled to room temperature and neutralized by adding 3.50 g of glacial acetic acid and stirring for 10 minutes. The polymer was recovered by vacuum filtration and washed in a Waring blender: five times with 350 mL of 5:1 (by volume) of acetone/water and twice with 350 mL of pure acetone. The polymer was glyoxal-treated by adding 0.40 g of 40% aqueous glyoxal and 0.25 g of glacial acetic acid to the last acetone desiccation. The polymer was dried in vacuo at 50° C. overnight, yielding 26.72 g of an off-white powder with a volatiles content of 7.04% and an ash content (as sodium acetate) of 7.52%. The 1% aqueous viscosity of the diethylaminoethyl HmHEC polymer (corrected for ash and volatiles) was measured at 25.0° C. and found to be 90,000 cP (Brookfield LVT, 6 rpm, spindle #4). The diethylaminoethyl substitution was found to be 2.13% (DS=0.448) by Kjeldahl analysis.

Example 13

Preparation of Carboxymethyl Hydrophobe-Modified Hydroxyethyl Cellulose

A 250 ml three-necked round bottomed flask was fitted with a mechanical stirring paddle, a nitrogen inlet, a rubber serum cap, and a reflux condenser connected to a mineral oil bubbler. The flask was charged with 15.89 g (15.00 g contained) of hydrophobe-modified hydroxyethyl cellulose of Example 2 (hexadecyl DS=0.0185), 87 g of isopropyl alcohol, and 13 g of distilled water. While stirring the mixture, the resin kettle was purged with nitrogen for one hour to remove any entrained oxygen in the system. While stirring under nitrogen, 7.00 g of 50% aqueous sodium hydroxide solution were added dropwise over five minutes using a syringe. The mixture was then allowed to stir for 30 minutes under nitrogen.

A solution of 1.80 g of chloroacetic acid (CAA) in 5 mL of isopropyl alcohol was added to the mixture dropwise under nitrogen over 20 minutes using a syringe. After the addition was complete the mixture was heated to reflux with stirring and held at reflux for 4.5 hours under nitrogen. The mixture was then cooled to room temperature and neutralized by adding 6.00 g of glacial acetic acid and stiffing for 10 minutes. The polymer was recovered by vacuum filtration and washed in a Waring blender: five times with 300 mL of 5:1 (by volume) of acetone/water and twice with 300 mL of pure acetone. The polymer was dried in vacuo at 50° C. overnight, yielding 15.46 g of an off-white powder with a volatiles content of 3.62% and an ash content (as sodium acetate) of 12.39%. The 1% aqueous viscosity of the carboxymethyl HmHEC polymer (corrected for volatiles only) was measured at 25.0° C. and found to be 38,000 cP (Brookfield LVT, 6 rpm, spindle #4). The carboxymethyl DS was found to be 0.371 by non-aqueous titration.

Example 14

Preparation of Cationic Hydrophobe-Modified Hydroxyethyl Cellulose from Wood Pulp A three pint, glass Cemco™ pressure reactor was charged with 25.00 g (contained) of single cut Tartas Biofloc XV wood pulp, 292.0 g of isopropyl alcohol and 45.5 g of distilled water. The mixture was stirred for one hour while purging the headspace of the reactor with nitrogen at a rate of 500 mL/min to remove any entrained oxygen. The reactor was fitted with an ice water condenser to prevent evaporative losses of the diluent during the nitrogen purge. The temperature of the slurry was adjusted to 32° C. using a water bath.

After purging for one hour, 38.64 g of 22% (by weight) aqueous sodium hydroxide solution (1.38 moles of sodium hydroxide per anhydroglucose unit) were added to the slurry by syringe, and the temperature of the slurry increased from 32° C. to 35° C. The slurry was stirred for one hour at 35° C., while continuing the nitrogen headspace purge. A charge of freshly distilled ethylene oxide (30.2 g, 4.448 moles of ethylene oxide per anhydroglucose unit) was added to the reactor, and with continuous stirring, the reactor was sealed. The slurry was heated with a water bath to 75° C., and the reaction was continued at 75° C. for 1 hour. After a total of 1 hour at 75° C., the slurry was cooled to 55° C. and sodium hydroxide concentration of the reaction mixture was adjusted to 0.100 moles of sodium hydroxide per mole of cellulose by adding 6.75 g glacial acetic acid to the reaction slurry by syringe. The slurry was stirred for 5 minutes, then 30.00 g of 1-bromohexadecane were added to the reactor by syringe (0.623 moles of 1-bromohexadecane per anhydroglucose unit). 10 mL of nitrogen-purged isopropyl alcohol was taken up into the syringe and added to the reactor through the injection port to rinse the port and syringe of residual hydrophobe. The slurry was then heated from 55° C. to 85° C. and held at 85° C. for three hours.

The slurry was cooled to 55° C., and 10.0 g of 70% glycidyl trimethylammonium chloride were added to the slurry by syringe (0.299 moles of glycidyl trimethylammonium chloride per anhydroglucose unit). The slurry was held at 55° C. for 1.5 hours. The slurry was cooled to room temperature and 11.25 g of glacial acetic acid were added by syringe. After stirring for 15 minutes, the polymer was collected by vacuum filtration through a flitted metal Buchner funnel. The polymer was washed in a Waring blender three times with a mixture of 440 mL isopropyl alcohol and 54 mL of water, and twice with 500 mL of pure isopropyl alcohol. 0.75 g of 40% glyoxal and 0.50 g of glacial acetic acid were added to the second isopropyl alcohol desiccation wash to glyoxal-treat the cationic HmHEC polymer. The polymer was dried in vacuo at 50° C. overnight, yielding 43.69 g of an off-white solid. The volatiles content was found to be 4.81%, the ash content (as sodium acetate) was found to be 6.07%. The 1% solution viscosity of the polymer (corrected for ash and volatiles) was found to be 71,000 mPa-sec (Brookfield LVT, spindle #4, 6 rpm). The ethylene oxide MS (EO MS) was found to be 1.96 and the hexadecyl DS was found to be 0.0089 by Zeisel analysis. The cationic substitution was found to be 0.57% (CS=0.108) by Kjeldahl analysis.

In Table below D/C is the weight ratio of diluent to cellulosic starting material. A/C is the molar ratio of alkali (sodium hydroxide) to anhydroglucose unit in the cellulosic starting material.

Comparative Example 15

Preparation of Hydrophobe-Modified Hydroxyethyl Cellulose

A 3000 ml three-necked round bottomed flask was fitted with a mechanical stiffing paddle, a nitrogen inlet, a rubber serum cap, and a reflux condenser connected to a mineral oil bubbler. The resin kettle was charged with 199.94 g (184.46 g contained) of CELLOSIZE® HEC QP-52,000H hydroxyethyl cellulose, 1056 g of isopropyl alcohol, and 144 g of distilled water. While stirring the mixture, the resin kettle was purged with nitrogen for one hour to remove any entrained oxygen in the system. While stiffing under nitrogen, 24.79 g of 50% aqueous sodium hydroxide solution were added dropwise over five minutes using a syringe. The mixture was then allowed to stir for 30 minutes under nitrogen.

The mixture was heated to reflux with stirring under nitrogen. At reflux, 22.53 g of 1-bromohexadecane were added slowly over 5 minutes. The mixture was then held at reflux for 4.5 hours with stirring under nitrogen. The mixture was then cooled to room temperature and neutralized by adding 31.0 g of glacial acetic acid and stiffing for 10 minutes. The polymer was recovered by vacuum filtration and washed in a Waring blender: four times with 1500 mL of 4:1 (by volume) of acetone/water and twice with 1500 mL of pure acetone. The polymer was glyoxal-treated by adding 2.5 g of 40% aqueous glyoxal and 1.5 g of glacial acetic acid to the last acetone desiccation. The polymer was dried in vacuo at 50° C. overnight, yielding 192.81 g of an off-white powder with a volatiles content of 6.00% and an ash content (as sodium acetate) of 2.58%. The hexadecyl DS (by Zeisel analysis) was found to be 0.0058.

Example 16

NaAMPS-Modified Hydrophobe-Modified Hydroxyethyl Cellulose

A 1000 ml three-necked round bottomed flask was fitted with a mechanical stiffing paddle, a nitrogen inlet, a rubber serum cap, and a reflux condenser connected to a mineral oil bubbler. The resin kettle was charge with 45.94 g (42.00 g contained) of hydrophobe-modified hydroxyethyl cellulose described above in example 15 (hexadecyl DS=0.0058), 267 g of isopropyl alcohol, and 40 g of distilled water. While stirring the mixture, the resin kettle was purged with nitrogen for one hour to remove any entrained oxygen in the system. While stiffing under nitrogen, 10.08 g of 25.21% aqueous sodium hydroxide solution were added dropwise over five minutes using a syringe. The mixture was then allowed to stir for 30 minutes under nitrogen. Then, 1.74 g of sodium 2-acrylamido-2-methyl-1-propanesulfonate (NaAMPS) was added, and the resulting mixture was stirred for 5 minutes.

The mixture was heated to reflux with stirring and held at reflux for 4.5 hours under nitrogen. The mixture was then cooled to room temperature and neutralized by adding 5.00 g of glacial acetic acid and stirring for 10 minutes. The polymer was recovered by vacuum filtration and washed in a Waring blender: four times with 400 mL of 4:1 (by volume) of acetone/water and twice with 400 mL of pure acetone. The polymer was glyoxal-treated by adding 0.80 g of 40% aqueous glyoxal and 0.50 g of glacial acetic acid to the last acetone desiccation. The polymer was dried in vacuo at 50° C. overnight, yielding 41.97 g of an off-white powder with a volatiles content of 2.46% and an ash content (as sodium acetate) of 2.47%. The AMPS DS was found to be 0.023 (% S=0.286%) by elemental analysis.

TABLE 1

| (Comparative) example | Starting material | Diluent system | D/C | A/C | Reagent | Reagent/HEC mole ratio | Reaction conditions |
|---|---|---|---|---|---|---|---|
| 1* | CELLOSIZE QP-30000H | 13.5% water in isopropyl alcohol | 6.67 | 0.417 | BHD | 0.237 | 4.5 hr at 80° C. |
| 2* | CELLOSIZE QP-30000H | 13.5% water in isopropyl alcohol | 6.67 | 0.417 | BHD | 0.237 | 4.5 hr at 80° C. |
| 3* | CELLOSIZE QP-30000H | 13.5% water in isopropyl alcohol | 6.67 | 0.417 | BHD | 0.237 | 4.5 hr at 80° C. |
| 4* | CELLOSIZE QP-2000 | 13.5% water in isopropyl alcohol | 6.67 | 0.417 | BHD | 0.237 | 4.5 hr at 80° C. |
| 5* | CELLOSIZE QP-100MH | 13.5% water in isopropyl alcohol | 6.67 | 0.417 | BHD | 0.237 | 4.5 hr at 80° C. |
| 6 Cationic HmHEC | HmHEC from Example 4 | 17.5% water in isopropyl alcohol | 6.00 | 0.172 | GMAC | 0.176 | 1.5 hr at 55° C. |
| 7 Cationic HmHEC | HmHEC from Example 1 | 17.5% water in isopropyl alcohol | 6.00 | 0.172 | GMAC | 0.176 | 1.5 hr at 55° C. |
| 8 Cationic HmHEC | HmHEC from Example 5 | 17.5% water in isopropyl alcohol | 6.00 | 0.172 | GMAC | 0.176 | 1.5 hr at 55° C. |
| 9 Sulfoethyl HmHEC | HmHEC from Example 4 | 13% water in isopropyl alcohol | 6.67 | 1.67 | SVS | 0.240 | 3 hr at 80° C. |
| 10 Sulfoethyl HmHEC | HmHEC from Example 2 | 13% water in isopropyl alcohol | 6.67 | 1.67 | SVS | 0.240 | 3 hr at 80° C. |
| 11 Sulfoethyl HmHEC | HmHEC from Example 5 | 13% water in isopropyl alcohol | 6.67 | 1.67 | SVS | 0.240 | 3 hr at 80° C. |
| 12 DEAE-HmHEC | HmHEC from Example 3 | Isopropyl alcohol | 12.0 | 1.28 | DEAEC | 0.901 | 2 hr at 40° C. |
| 13 Carboxymethyl HmHEC | HmHEC from Example 2 | 13% water in isopropyl alcohol | 6.67 | 1.46 | CAA | 0.318 | 4.5 hr at 80° C. |
| 15* | CELLOSIZE QP-52000H | 12.0% water in isopropyl alcohol | 6.51 | 0.420 | BHD | 0.100 | 4.5 hr at 80° C. |
| 16 Anionic HMHEC | HmHEC from example 15 | 13.0% water in isopropyl alcohol | 7.31 | 0.378 | NaAMPS | 0.0452 | 4.5 hr at 80° C. |

*Comparative Example
BHD = 1-bromohexadecane,
GMAC = glycidyl trimethylammonium chloride,
SVS = sodium vinyl sulfonate,
DEAEC = diethylaminoethyl chloride hydrochloride,
CAA = chloroacetic acid
CAA = chloroacetic acid,
NaAMPS = sodium 2-acrylamido-2-methyl-1-propanesulfonate

TABLE 2

Properties of the Cellulose Ethers

| (Comparative) Example | Hydrophobe EO MS | DS | Cationic, tertiary amino or anionic substitution | 1% Brookfield (6 rpm), mPa-sec | MW | Dynamic solution viscosity, mPa-sec 25° C. | Dynamic solution viscosity, mPa-sec 80° C. | Viscosity Retention Δ 80/25 |
|---|---|---|---|---|---|---|---|---|
| 1*: High DS HmHEC | 2.04 | 0.0181 | | Insoluble | — | — | — | — |
| 2*: High DS HmHEC | 2.09 | 0.0185 | | Insoluble | — | — | — | — |
| 3*: High DS HmHEC | 2.07 | 0.0175 | | Insoluble | — | — | — | — |
| 4*: High DS HmHEC | 2.43 | 0.0145 | | Insoluble | — | — | — | — |
| 5*: High DS HmHEC | 2.30 | 0.0125 | | Insoluble | — | — | — | — |
| 6: Cationic HmHEC | 2.43 | 0.0145 | Cationic substitution CS = 0.103 | 33,500 | | 3059.5 | 1398.2 | 45.7% |
| 7: Cationic HmHEC | 2.04 | 0.0181 | Cationic substitution CS = 0.101 | 65,300 | | 4538.5 | 6400.4 | 141.0% |
| 8: Cationic HmHEC | 2.30 | 0.0125 | Cationic substitution CS = 0.109 | 90,000 | | 6177.6 | 6311.3 | 102.2% |
| 9: Sulfoethyl HmHEC | 2.43 | 0.0145 | Sulfoethyl DS = 0.211 | 16,500 | | 1237.4 | 258.31 | 20.9% |
| 10: Sulfoethyl HmHEC | 2.09 | 0.0185 | Sulfoethyl DS = 0.177 | 39,500 | | 3335.5 | 3103.1 | 93.0% |
| 11: Sulfoethyl HmHEC | 2.30 | 0.0125 | Sulfoethyl DS = 0.221 | 41,000 | | 1917.9 | 591.66 | 30.8% |
| 12: DEAE-HmHEC | 2.07 | 0.0175 | Diethylaminoethyl substitution DS = 0.448 | 90,000 | | 5945.3 | 2173.8 | 36.6% |
| 13: Carboxymethyl HmHEC | 2.09 | 0.0185 | Carboxymethyl DS = 0.371 | 38,000 | | 4886.1 | 1973.5 | 40.4% |
| 14: Cationic HmHEC from wood pulp | 1.96 | 0.0089 | Cationic substitution CS = 0.108 | 49,500 | | 4073.8 | 3994.3 | 98.0% |
| 15* | 2.0 | 0.0058 | — | — | | — | — | — |
| 16 Anionic HMHEC | 2.0 | 0.0058 | 0.023 | 46,800 | — | 3902.0 | 2434.8 | 62.4% |
| A*: CELLOSIZE ™ HEC QP-30000H | 2.0 | 0 | | 3071 | 1.43E+06 | 2017.8 | 301.2 | 14.9% |
| B*: CELLOSIZE ™ HEC QP-100MH | 2.0 | 0 | | 6900 | 1.78E+06 | 4303.0 | 846.6 | 19.7% |
| C*: CELLOSIZE ™ HEC QP-2000 | 2.0 | 0 | | 232 | 7.80E+05 | 231.3 | 26.64 | 11.5% |
| D*: NATROSOL ™ HE 10K HmHEC from year 2004 | 2.55 | 0.0064 | | 8020 | 1.07E+6 | 3596.4 | 402.9 | 11.2% |
| E*: NATROSOL ™ HE 10K HmHEC from year 2009 | 3.34 | 0.0071 | | 6340 | 1.10E+6 | 2220.9 | 608.5 | 27.4% |
| F*: NATROSOL ™ Plus 330 HmHEC | 3.60 | 0.0097 | | 910 | 5.75E+05 | 500.6 | 27.90 | 5.6% |
| G*: NATROSOL ™ Plus 330 HmHEC, different sample | 3.47 | 0.0096 | | 915 | 5.64E+05 | 518.5 | 30.13 | 5.8% |
| H*: CELLOSIZE ™ HMHEC 500 | 3.56 | 0.0070 | | 3120 | 1.06E+06 | 1396.9 | 197.3 | 14.1% |
| I*: TYLOSES ™ HX 8000 | 2.32 | — | | 1164 | 6.32E+05 | 489.5 | 24.93 | 5.1% |

*Comparative Example

What is claimed is:

1. A cellulose ether having
    (i) one or more substituents selected from the group consisting of methyl, hydroxyethyl and hydroxypropyl,
    (ii) one or more hydrophobic substituents consisting of acyclic or cyclic, saturated or unsaturated, branched or linear alkyl hydrocarbon groups having at least 8 carbon atoms, and
    (iii) one or more cationic, tertiary amino, or anionic substituents, and having a retained dynamic viscosity, $\%\eta_{80/25}$, of at least 30 percent, wherein $\%\eta_{80/25}$ = [dynamic solution viscosity at 80° C./dynamic solution viscosity at 25° C.] × 100, the dynamic solution viscosity at 25° C. and 80° being measured as 1% aqueous solution.

2. The cellulose ether of claim 1 having one or more cationic substituents of the formula I

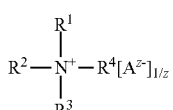

(I)

wherein
$R^1$, $R^2$ and $R^3$ each independently are $CH_3$, $C_2H_5$, or $C_3H_7$,
$R^4$ is $CH_2$—CHOH—$CH_2$— or $CH_2CH_2$—,
$A^{z-}$ is an anion, and z is 1, 2 or 3.

3. The cellulose ether of claim 1 having one or more sulfo-$C_{1-6}$-alkyl groups.

4. The cellulose ether of claim 1 having one or more carboxymethyl or carboxyethyl groups.

5. The cellulose ether of claim 1 having one or more dimethylamino, diethylamino, or diisopropylamino groups.

6. The cellulose ether of claim 1 having a Brookfield viscosity of at least 20,000 mPa-sec, measured as 1% aqueous solution at 6 rpm, spindle 4 at 25° C.

7. The cellulose ether of claim 1 having a weight average molecular weight of at least 750,000.

8. The cellulose ether of claim 1 having a retained dynamic viscosity $\%\eta_{80/25}$ of at least 35 percent.

9. The cellulose ether of claim 1 wherein the average level of substitution with said one or more hydrophobic substituents is from 0.007 to 0.025 moles per mole of anhydroglucose unit.

10. The cellulose ether of claim 1 having a hydroxyethyl molar substitution of from 1.5 to 3.5.

11. A composition selected from the group consisting of wellbore servicing fluids, cementitious formulations, ceramics, metal working fluids and cutting fluids comprising a cellulose ether having
   (i) one or more substituents selected from the group consisting of methyl, hydroxyethyl and hydroxypropyl,
   (ii) one or more hydrophobic substituents, and
   (iii) one or more cationic, tertiary amino, or anionic substituents.

12. The composition of claim 11 comprising the cellulose ether of claim 1.

\* \* \* \* \*